United States Patent [19]

Troy

[11] Patent Number: 5,060,686

[45] Date of Patent: Oct. 29, 1991

[54] MULTI-PIECE NOZZLE FOR STEAM CONDENSATE REMOVAL DEVICES

[75] Inventor: Michael Troy, Westmont, Ill.

[73] Assignee: Engineering Resources, Inc., Chicago, Ill.

[21] Appl. No.: 457,361

[22] Filed: Dec. 27, 1989

[51] Int. Cl.⁵ ................................................ F16T 1/34
[52] U.S. Cl. ...................................... 137/171; 138/44
[58] Field of Search ................... 137/171, 183; 138/44

[56] References Cited

U.S. PATENT DOCUMENTS

| | | | |
|---|---|---|---|
| 2,434,008 | 1/1948 | Osborn | 138/44 |
| 3,018,799 | 1/1962 | Volkmann | 138/44 X |
| 4,486,208 | 12/1984 | Stavropoulos | 55/466 |
| 4,592,381 | 6/1986 | Troy | 137/183 X |
| 4,644,974 | 2/1987 | Zingg | 138/44 |
| 4,745,943 | 5/1988 | Mortensen | 137/177 |

*Primary Examiner*—Alan Cohan
*Attorney, Agent, or Firm*—Laff, Whitesel, Conte & Saret

[57] ABSTRACT

A device for draining condensate or the like from steam piping systems while retaining the live steam within the steam piping system, which comprises a body structure having an entrance end, an exit end, and an internal cylindrical bore to permit fluid to flow into the entrance end and out of the exit end; and a nozzle structure removeably mounted within the cylindrical bore formed of a plurality of mutually separable, partially cylindrical insert segments which combine to form the nozzle and define a constricted passageway.

7 Claims, 1 Drawing Sheet

MULTI-PIECE NOZZLE FOR STEAM CONDENSATE REMOVAL DEVICES

This invention relates to devices for removing liquids from fluid conduit systems while preventing the escape of vaporous substances contained therein. More particularly, the invention relates to a nozzle for use in a continuous flow steam condensate removal device that is placed in a steam piping system to drain the condensate that has accumulated therein. The nozzle comprises a plurality of segments which form an internal constricted passageway which, when sized appropriately, causes the condensate to impede the flow of steam immediately upstream of the nozzle, the condensate being discharged through the nozzle as a result of the increased steam pressure.

BACKGROUND OF THE INVENTION

In typical systems utilizing steam to supply energy for heating, cooking or mechanical work, the steam has a tendency to condense into water as it expends its energy. This water or condensate must be removed from the steam piping system to prevent it from interfering with the piping system or the mechanisms utilizing the steam energy. Thus, steam piping systems must be provided with equipment for removing the condensate.

Mechanical devices, such as steam traps, were and still are widely used to remove or drain condensate from steam piping systems. These devices are designed to prevent the escape of live steam by attempting to distinguish steam from condensate, usually by differentiating temperature, buoyancy effects or thermodynamic properties. Steam traps are basically valves that employ moving parts and operate intermittently, remaining closed until a predetermined amount of condensate has collected, then opening to allow the condensate to pass through, typically to a boiler return line. Because these steam traps employ moving parts and are usually subject to harsh operating conditions, they have a tendency to fail, often in the open position. Steam trap failures result in substantial steam losses, which require the production of additional steam at the expense of increased fuel consumption.

Continuous flow orifice or venturi nozzle condensate removal devices were designed to overcome the problems associated with intermittently operating mechanical steam traps. The continuous flow condensate removal devices operate on the principle of two-phase fluid flow and do not employ moving parts. In these continuous flow devices, the mixture of steam and condensate flowing through the steam piping system is directed toward an orifice or venturi nozzle. When properly sized, a constricted passageway within the orifice or venturi nozzle causes the condensate, which is much denser and moves at a much slower speed than that of the steam, to interfere with the flow of steam. The area immediately upstream of the constricted passageway becomes, essentially, obstructed by the condensate, which therefore blocks the flow of steam, while the resulting pressure from the steam forces the condensate through the orifice or nozzle.

Several such continuous flow condensate removal devices are disclosed in U.S. Pat. Nos. 4,486,208 and 4,426,213 to Stavropoulos, and U.S. Pat. No. 4,745,943 to Mortensen. Stavropoulos discloses devices having a generally cylindrical body which houses a coaxially aligned, generally cylindrical bore between a converging conical entrance formation and a diverging conical exit formation. An elongated tubular nozzle structure is removeably mounted within the bore and is provided with an internal constricted passageway therethrough, which is sized according to certain predetermined characteristics of a particular steam flow application to sufficiently block the flow of steam while allowing for the discharge of condensate. The tubular nozzle structure is replaceable with other tubular nozzle structures having different size constricted passageways to meet varying steam flow applications.

Mortensen discloses a similar steam condensate removal device, wherein the venturi-type nozzle structure is formed integrally within the generally cylindrical body between an upstream condensate collection passageway and a downstream conical discharge passageway. The constricted passageway within the nozzle structure is selected for a particular steam flow application, but the entire condensate removal device is adapted to be replaced with other identically configured devices having different size constricted passageways for varying steam flow applications.

These and other continuous flow condensate removal devices are designed to discharge the accumulated condensate while at the same time prevent the passage of live steam. The devices must also discharge the condensate at a rate sufficient to prevent the condensate from backing-up into the steam piping and interfering with the steam system. In order to achieve this balance of operation, the constricted passageway within the nozzle must be provided with an appropriate configuration, including length and diameter, which depends on the characteristics of the mixture of steam and condensate. Different characteristics of the mixture, for example pressure, temperature and percent condensate, require different size constricted passageways.

The diameters of the constricted passageways in continuous flow steam condensate removal devices are sometimes required to be very small, for example, in the range of two one-hundredths to two-tenths of an inch. In addition, this intermediate constricted section must generally be preceded by a converging entrance section. An appropriately configured diverging exit section immediately following the intermediate constricted section is also necessary to eliminate turbulence in the flow of the discharging condensate that could interfere with the flow through the constricted passageway. Since present nozzle structures consist of a single, elongated piece, these size and configuration constraints make manufacturing an appropriate internal constricted passageway difficult. Some optimum sizes and configurations cannot efficiently be achieved within the nozzle structure using current machining and drilling techniques.

Furthermore, although most continuous flow condensate removal systems employ screens and filters to remove particulate debris contained in the mixture of steam and condensate, corrosive products and other debris have been known to pass through to the nozzle structure and collect on the surface of the internal constricted passageway. This reduces the diameter of the constricted passageway, thereby interfering with the operation of the device. Manufacturers of continuous flow devices have attempted to prevent the build-up of corrosion by-products by coating the constricted passageway with a non-stick substance, for example a fluorocarbon material, such as Teflon ®. However, the unitary construction of presently employed nozzle structures makes preparation of the surface of the internal constricted passageway, including de-burring, cleaning and heating, difficult. The added difficulty of applying a uniform thickness of Teflon ® to the inner surface of the constricted passageway makes this process cost-prohibitive.

SUMMARY OF THE INVENTION

Therefore, it is an object of the present invention to provide a nozzle structure that can be used in a continuous flow condensate removal device and is constructed so as to make the manufacture of its internal constricted passageway relatively simple.

It is a further object of this invention to provide a nozzle having an internal constricted passageway that can be easily treated to prevent the build-up of corrosion by-products or particulate debris.

According to the present invention, these and other objects are achieved by providing a nozzle structure that can be used in a continuous flow condensate removal device having a body with an entrance end, an exit end, and an internal cylindrical bore providing a fluid flow conduit therebetween. One of a variety of nozzle structures having various internal constricted passageways therethrough is removeably mounted in the cylindrical bore to restrict the flow of steam while allowing the condensate to be discharged therefrom. Thus, a standardized body having a standardized bore configuration may be used with a variety of nozzle structures to allow for convenient installation within the standardized device in accordance with specific constricted passageway dimensional requirements dictated by a particular steam system application.

The inventive nozzle structure of the preferred embodiment is comprised of two half-cylindrical, longitudinally symmetrical segments which combine to form an internal constricted passageway therethrough. The segments are individually stamped or coined prior to assembly and insertion into the bore, and therefore can easily be formed with any internal configuration. An insertable nozzle sleeve may also be provided to hold the nozzle segments in alignment within the bore. A constricted passageway having optimum dimensions for a particular steam application is therefore provided.

The two-piece open construction of the nozzle allows for easy configuration of the segments to provide a constricted passageway having a shape as dictated by the physics of the flow, without the obvious limitations and difficulties of conventional machining. The open construction also allows the surface of the generally narrow passageways to be treated with a non-stick material in various ways, such as by plating, laminating, cladding, or other means of deposition.

These and other objects and advantages of the present invention will be made apparent from the following detailed description with reference to the accompanying drawings.

DETAILED DESCRIPTION OF THE PREFERRED EMBODIMENT

Figure 1:
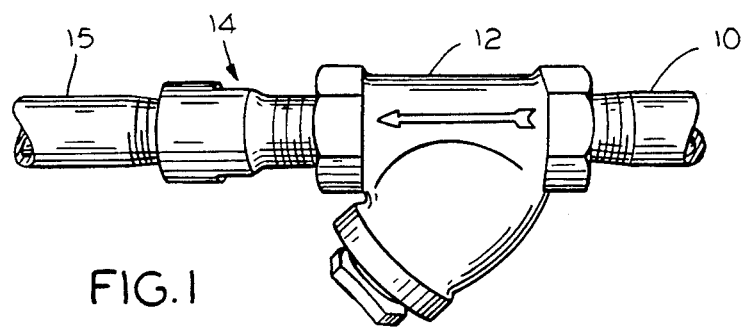
FIG. 1 illustrates a steam condensate removal device in a typical steam line including an embodiment of a continuous flow condensate removal device for use with the nozzle structure according to the present invention.

Referring to the condensate removal line as shown in FIG. 1, a mixture of condensate and steam is directed from pipe 10 into a conventional Y-strainer device 12 from right to left as indicated by the direction of the arrow. The Y-strainer 12 filters steam and condensate to remove larger particulate debris that may be entrained therein. After exiting the Y-strainer, the mixture of steam and condensate flows to the condensate removal device 14, which is connected to the left-hand outlet of the Y-strainer. The condensate is forced through condensate removal device 14, and is drained through condensate return line 15, which typically leads to a steam boiler (not shown).

Figure 2:
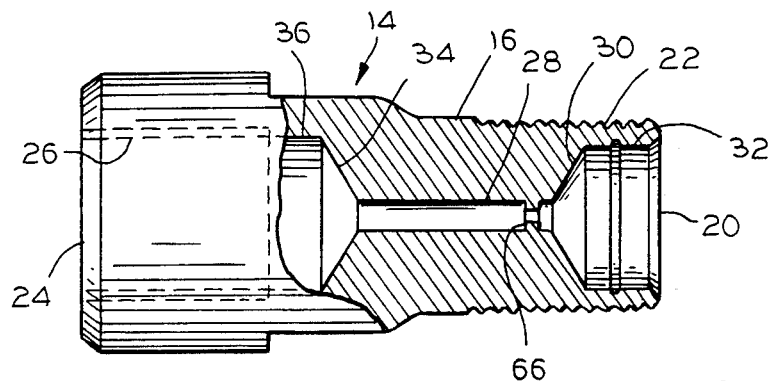
FIG. 2 is an enlarged side view of the condensate removal device shown in FIG. 1, shown in partial cross-section with the nozzle structure removed.

Referring to FIG. 2, condensate removal device 14 is comprised of generally cylindrical body 16 having an entrance end 20 with connecting means such as external threaded section 22, and an exit end 24 with connecting means, such as internal threaded section or socket 26. The term cylindrical as used throughout this description is not limited to circular configurations, and includes other configurations such as triangular, square, rectangular, and other polygonal shapes. Threaded section 22 is designed for preferably threading directly into Y-strainer 12, and socket 26 is designed to receive and be attached to condensate return line 15, as shown in FIG. 1.

The body 16 houses a preferably coaxially aligned and generally cylindrical bore 28. Adjacent bore 28 is conical entrance 30 leading to a generally cylindrical entrance passage 32, which forms a somewhat recessed opening in entrance end 20 of the condensate removal device 14. Adjacent the opposite end of bore 28 is conical exit 34 leading to a generally cylindrical exit passage 36, which communicates directly with socket 26 in exit end 24 of the condensate removal device 14. Bore 28 is configured to receive a generally elongated removable cylindrical nozzle structure, designated by general reference number 38 and illustrated in FIG. 3.

Figure 4:
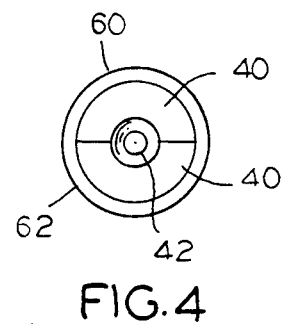
FIG. 4 is an end view of the nozzle and sleeve structure as seen from line 4—4 of FIG. 3.
Figure 3:
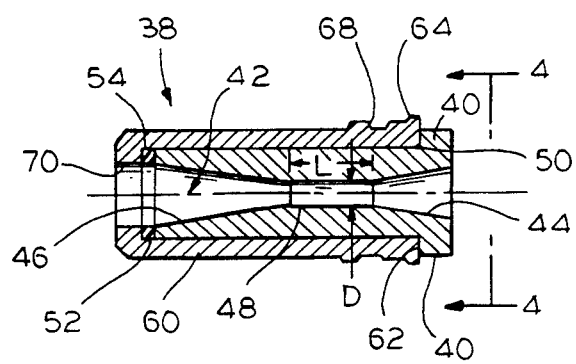
FIG. 3 is a longitudinal cross-section view of the nozzle structure and nozzle sleeve according to the present invention.

Referring to FIGS. 3 and 4, nozzle structure 38 is comprised of two longitudinally symmetrical insert segments 40 and a nozzle sleeve 60. In the illustrated embodiment, insert segments 40 are mutually separable and generally partially cylindrical in configuration and comprise annular shoulder or flange formations 50 at one end. Insert segments 40 are mountable within sleeve 60 so that shoulders 50 abut the flat, annular end 62 of sleeve 60. Insert segments 40 are held within sleeve 60 by means of a frictional press fit, a high-temperature adhesive, or any other suitable means. Although the illustrated embodiment of the invention shows two insert segments 40 mounted in sleeve 60, it is to be understood that nozzle structure 38 could comprise more than two insert segments 40. In addition, insert segments 40 may be mountable directly within bore 28 and held therein by a frictional press fit or any other suitable means. When insert segments 40 are mounted directly in bore 28, flange formations 50 engage conical entrance 30 to align segments 40 within bore 28.

Figure 5:
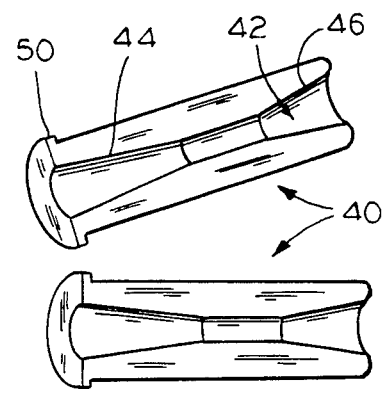
FIG. 5 is a perspective view of representative nozzle insert segments according to the present invention.

When insert segments 40 are mounted within either sleeve 60 or bore 28, they align to form an internal constricted passageway 42 (FIGS. 3 and 5). In the illustrated embodiment, constricted passageway 42 has a converging entrance formation 44, a diverging exit formation 46, and an intermediate constriction 48, having a length L and diameter D. However, it should be understood that passageway 42 may have any configuration, including a generally cylindrical configuration. Nozzle structure 38 is interchangeable with one of several nozzle structures having similar external sleeve configurations, but different insert segments 40 with varying internal dimensions for providing different constricted passageways 42 required for varying steam system applications. Similarly, if segments 40 are mounted directly within bore 28, they may be interchangeable with other segments having similar external configurations, but different constricted, optimally configured passageways 42 required for varying steam system applications.

Insert segments 40 are individually manufactured, by stamping, coining, or any other suitable process. It should therefore be appreciated that the insert segments 40 may be formed with any desired internal configuration during the stamping or coining process. That is, the length L and diameter D of the intermediate constriction 48, as well as the converging entrance formation 44 and diverging exit formation 46, may be varied to provide a constricted passageway suitable to any particular steam system application. It should also be appreciated that before insert segments 40 are assembled within sleeve 60 or bore 28, the surfaces of the respective halves which form internal constricted passageway 42 may be cleaned and prepared for treating with an appropriate material, such as by plating, laminating, cladding, or any other means of deposition, to prevent the buildup of particulates within passageway 42 and the deterioration of the surface of passageway 42.

Referring again to FIG. 3, insert segments 40 comprise rounded or otherwise relieved ends 52 to facilitate the insertion of the insert segments into sleeve 60. Sleeve 60 includes an outlet port 70 of sufficiently large diameter so as not to interfere with the flow of condensate exiting the constricted passageway 42 through diverging exit formation 46. A gasket 54 residing between outlet port 70 and the adjacent ends of insert segments 40 prevents condensate from flowing between insert segments 40 and sleeve 60, and directs the flow of condensate from diverging exit formation 46 through outlet port 70.

Figure 6:
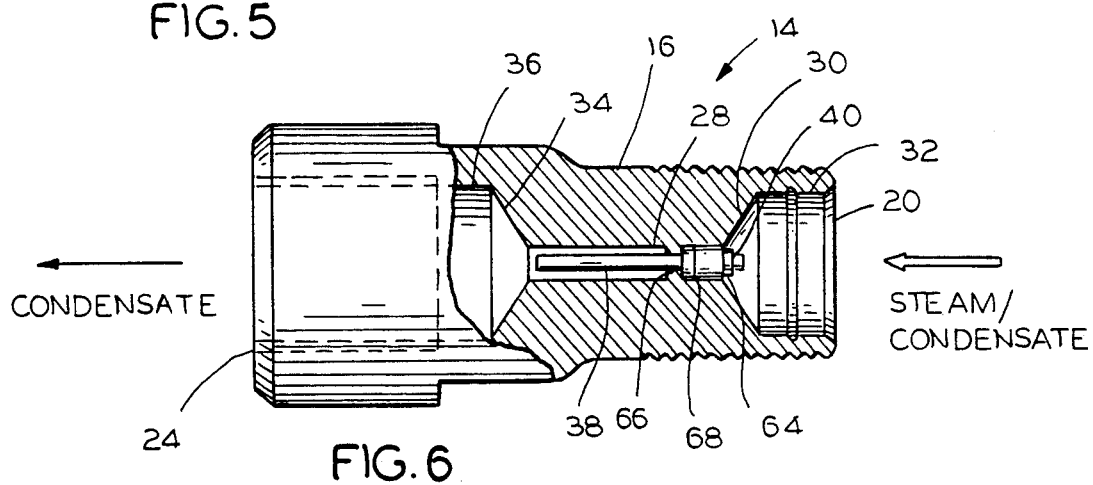
FIG. 6 is an enlarged and partially sectioned side view of a condensate removal device showing the nozzle structure of the present invention inserted therein.

Referring to FIG. 6, sleeve 60 of nozzle structure 38 is provided with a radially extending flange 64, which engages conical entrance 30 of body 16 to properly position nozzle structure 38 upon insertion into bore 28. Sleeve 60 is also provided with a capture section or first positioning means 68 which engages a corresponding annular hub or second positioning means 66 in the bore 28 (FIGS. 2, 6) to maintain nozzle structure 38 in a secure position within bore 28. Nozzle structure 38 may also be held within bore 28 by means of an interference press fit, a high-temperature adhesive, or any other suitable means.

If it becomes necessary to remove nozzle structure 38 from body 16, the body is removed from the steam system shown in FIG. 1, and a force is applied to the end of sleeve 60 adjacent outlet port 70 sufficient to overcome the force holding the sleeve 60 in body 16. Insert segments 40 are then removed from sleeve 60, replaced with new insert segments 40, and sleeve 60 is reinserted into bore 28 of body 16 as described above.

In operation, the mixture of steam and condensate is directed through a Y-strainer or similar filter device and toward the condensate removal device 14 (FIG. 6). The steam enters cylindrical passage 32 in entrance end 20, where it is directed by way of conical entrance 30 to the nozzle structure 38 residing in the cylindrical bore 28. The condensate entering the converging entrance formation 44 in constricted passageway 42 formed by insert segments 40, travelling at a much slower speed than that of the steam, impedes the flow of steam into constricted passageway 42. As a result, the condensate obstructs the constricted passageway 42 and is forced therethrough by the pressure from the steam immediately upstream from the intermediate constriction 48. The discharging condensate passes through diverging exit formation 46, which is configured according to a particular steam system application to prevent the flow of condensate through that formation from becoming turbulent and interfering with the flow of condensate through the constricted passageway 42. The condensate exits condensate removal device 14 through conical exit 34 and cylindrical passage 36 in exit end 24 of the device.

It should be recognized that while the invention has been described in relation to preferred embodiments thereof, those skilled in the art may develop a wide variation of structural details without departing from the principles of the invention. Therefore, the appended claims are to be construed to cover all equivalents falling within the true scope and spirit of the invention.

I claim:

1. A device for draining condensate and the like from steam piping systems while retaining the steam within the steam piping system, which comprises:
    (a) a body structure having an entrance end, an exit end, and an internal cylindrical bore extending between said entrance end and said exit end to allow fluid to flow into said entrance end and out of said exit end;
    (b) a nozzle structure removeably mounted within said cylindrical bore having a plurality of mutually separable, partially cylindrical insert segments which cylindrically combine to form a nozzle defining an internal constricted passageway through said nozzle structure;
    (c) first positioning means extending radially outwardly from said nozzle structure for positioning said partially cylindrical insert segments within said cylindrical bore;
    (d) and second positioning means extending radially inwardly from said cylindrical bore and cooperating with said first positioning means to position said nozzle structure within said cylindrical bore.

2. The device of claim 1, wherein said mutually separable, partially cylindrical insert segments are longitudinally symmetrical.

3. The device of claim 1, wherein said nozzle structure further comprises a cylindrical nozzle sleeve into which said insert segments are inserted, said first positioning means extending radially outwardly from said cylindrical nozzle sleeve.

4. The device of claim 3, wherein said nozzle sleeve comprises a generally annular opening into which said insert segments are inserted, and an outlet port opposite said annular opening to allow fluid to pass through said insert segments in said nozzle sleeve.

5. The device of claim 1, wherein said constricted passageway comprises a converging entrance formation to receive a flow of fluid into said cylindrical bore, a constriction adjacent thereto to interfere with the flow of fluid in said converging entrance formation and to obstruct the vaporous component of the fluid, and a diverging exit formation adjacent said constriction to allow the liquid component of the fluid to discharge from said nozzle structure.

6. The device of claim 1 or 2, wherein said insert segments further comprise relieved ends to facilitate their insertion into said annular opening of said nozzle sleeve.

7. The device of claim 1 or 3, wherein said first and second positioning means abut each other axially to limit the degree of insertion of said insert segments into said nozzle sleeve.

* * * * *